Feb. 17, 1953 J. KANTOR ET AL 2,628,825
COMBINED WATER COOLER AND CARBONATOR
Filed June 15, 1948 2 SHEETS—SHEET 1

INVENTORS
JAMES KANTOR AND
EDWARD ROSENBERG
BY
W. P. Hahn
ATTORNEY

Feb. 17, 1953 J. KANTOR ET AL 2,628,825
COMBINED WATER COOLER AND CARBONATOR
Filed June 15, 1948 2 SHEETS—SHEET 2

INVENTORS
JAMES KANTOR AND
EDWARD ROSENBERG
BY W. P. Hahn
ATTORNEY

Patented Feb. 17, 1953

2,628,825

UNITED STATES PATENT OFFICE 2,628,825

COMBINED WATER COOLER AND CARBONATOR

James Kantor and Edward Rosenberg, Chicago, Ill., assignors to The Liquid Carbonic Corporation, Chicago, Ill., a corporation of Delaware Application June 15, 1943, Serial No. 33,054

5 Claims. (Cl. 261—11)

The present invention relates to means for carbonating liquid and particularly means for carbonating water.

It has for its object that of in the same apparatus and in the same $CO_2$ atmosphere refrigerating the water and simultaneously carbonating the same.

Water for use in connection with carbonated beverages is usually refrigerated prior to carbonation in order that the water will absorb $CO_2$ at a relatively low pressure. In other words the degree to which water will absorb $CO_2$ is determined by two factors: (1) the temperature of the water and the pressure at which the $CO_2$ is imposed on it. If the temperature of the water is relatively high the pressure of the $CO_2$ must be correspondingly high to produce a predetermined absorption of the $CO_2$. Likewise if the temperature of the water is comparatively low the pressure of the $CO_2$ may be comparatively low to produce the same absorption.

Heretofore it has been customary in commercial practice to refrigerate the water prior to its delivery to the carbonator and while this system has proved to be commercially practicable it has the disadvantage of requiring the construction of two separate apparatus and the corresponding pick up of heat of the refrigerated water from transferring the refrigerated water to the carbonator. Furthermore where the temperature of the water is reduced in a separate refrigerating apparatus the water will pick up or dissolve considerably more air than would be the case where the water is refrigerated in an atmosphere of $CO_2$. The colder the water the more air it will dissolve and the more air picked up or dissolved in the water there is less opportunity for the absorption of $CO_2$.

It is one of the objects of the present invention to provide an apparatus wherein, in the same structure, the water may be refrigerated to the required temperature and while being refrigerated subjected to an atmosphere of $CO_2$ under the required pressure thereby to partially absorb a certain amount of $CO_2$. After refrigeration the water may then be again subjected to an atmosphere of $CO_2$ in the same apparatus and while subjected to the $CO_2$ atmosphere atomized to break the water into fine particles to increase its $CO_2$ absorption qualities.

A further object of our invention is to provide a connection between the refrigeration evaporator, located in the carbonating tank, and the accumulator of the refrigerating system, which connection or coupling will prevent $CO_2$ from seeping into the refrigerating line and prevent the refrigerant from seeping into the $CO_2$ atmosphere within the carbonating tank.

For the purpose of disclosing our invention we have illustrated an embodiment thereof in the accompanying drawing in which.

Figure 1:
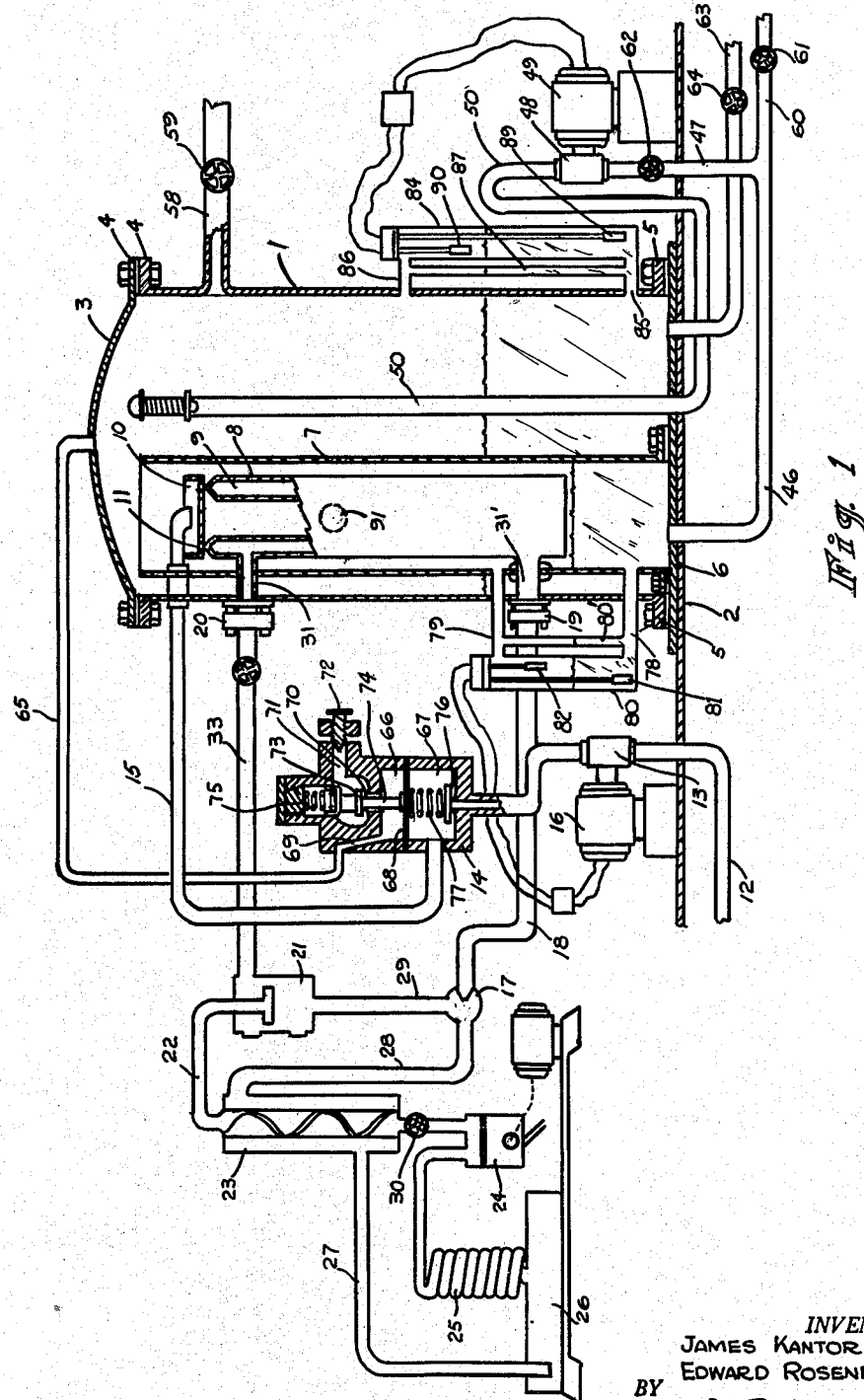
Fig. 1 is a longitudinal sectional view more or less diagrammatic of an apparatus embodying our invention.

In the embodiment illustrated we provide a preferably cylindrical tank 1 supported on a suitable base 2 and closed by a removable dome 3, the dome and tank having flanges 4—4 by which the dome may be secured to the tank body. A suitable gasket is imposed between the flanges to make an airtight joint on this point.

The bottom of the tank 1 is likewise provided with an annular flange 5 by which it may be secured to a bottom plate 6 and by the same bolts, extending through the flange, to the case or bed 2.

Arranged within the cylindrical tank 1 is what may be termed a refrigerating tank 7. This tank is preferably cylindrical in shape being open at its top and closed at its bottom by the same bottom plate 6 which closes the bottom of the tank 1.

The refrigerating tank 7 has disposed therein a double walled tubular refrigerating tube or evaporator 8. Due to the double walled construction of this unit, suitable space is provided between the two walls as at 9 for the circulation therethrough of a refrigerant which may be Freon or any of the other desirable refrigerants capable of rapid evaporation for the absorption of heat and condensation back to liquid giving up the heat so absorbed during such condensation.

Mounted above the refrigerating tube 8 is a water distributing cup 10 having suitable openings, as at 11, above the tapered edge of tube 8 so that as the water passes out through these openings 11 it will film down the sides of the refrigerating tube 8 to thereby quickly give up its heat to the refrigerant circulating within the tube.

Water is delivered to the distributor cup, from a suitable source of supply of preferably filtered water, through the pipe 12, connected with said source and connected to a pump 13 by which, through a shift control valve 14 and a pipe 15, it is delivered to the top of the distributing cup. The pump 13 is operated, through a suitable drive mechanism, by an electric motor 16 controlled by suitable relay in a manner to be more fully described hereinafter.

The refrigerant may be of any of the desirable refrigerating mediums such as Freon. This refrigerant is delivered at the bottom of the condenser or cooling tube 8 through an injector nozzle 17 and the conduit 18 connected to the evaporator 8 through a suitable joint 19. The refrigerant passes upwardly through the evaporator 8 absorbing the heat from the water as it films over the surface of the evaporator and passes out of the top of the evaporator through a connection 20 into a Freon accumulator 21 from whence it passes by conduit 22 through a heat exchanger 23 to a compressor 24 and thence into the condenser 25 into the storage tank 26. From the storage tank 26 the condensed Freon passes by the conduit 27 and conduit 28 to the injection nozzle 17. A by-pass connection 29 extends from the accumulator 21 to the injection nozzle 17. A back pressure regulator 30 is provided in the exhaust line 22.

Figure 2:
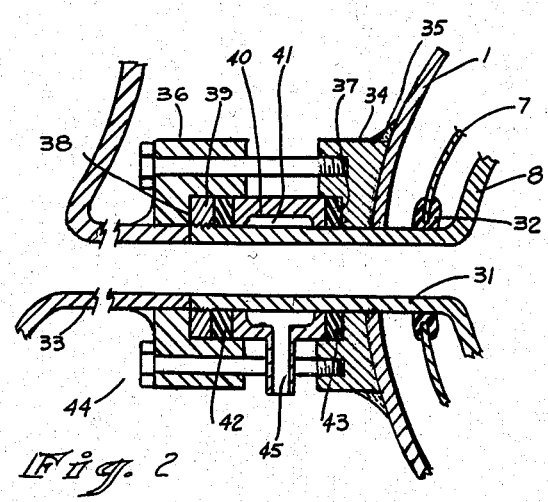
Fig. 2 is a detailed section of the joint or connection between the external refrigerating accumulator and the internally disposed evaporator.

In order to prevent any leakage of the Freon into the tank 1 or any leakage of $CO_2$ from the tank 1 into the Freon line we provide the coupling seals 19 and 20 between the intake and discharge lines of the accumulator and the intake and discharge of the evaporator 8. Such a coupling is disclosed more specifically in Fig. 2 of the drawings which is a sectional view of the coupling 19. As illustrated in Fig. 2 the evaporator 8 is provided with a discharge conduit 31 which may be integrally formed at the outer wall of the evaporator 8 or may be a separate pipe welded into said wall. This conduit extends through the walls respectively of the tank 7 and the tank 1. Where the conduit 31 passes through the wall of the tank 7 a rubber or other plastic sealing grommet 32 embraces the walls of the opening and surrounds the conduit 31 which seals this joint. In view of the fact that the water level in tank 7 does not rise above the conduit 31 this grommet may be dispensed with for the conduit 31 and used only at the inlet nozzle 31' connected by a similar coupling with the conduit 18.

The accumulator 21 is provided with an inlet conduit 33 which the like the conduit 31 may be integrally formed with the wall of the accumulator or may be welded in position. The end of this conduit 33 makes a butt joint with the end of the conduit 31. A flange 34 surrounding the conduit 31 is welded as at 35 to the exterior of the tank 1. A similar flange 36 is welded adjacent the end of the conduit 33. These two flanges 34 and 36 are undercut respectively at 37 and 38, the undercut 38 being greater in depth than the undercut 37. The end of the conduit 31 has screw-threaded thereon a stop ring 39 and interposed between this stop ring and the flange 34 is a vent gland 40 having an internal annular recess 41. This vent gland has interposed between it and the walls of the flange 34 and the ring 39 suitable packing rings 42 and 43 which when the parts are drawn together by the tightening of the ring 39 and the tightening of the bolts 44 in the flanges 36 and 34 tightly seal the parts in position. Any Freon leak out of the conduits would eventually find its way into the recess 41 and as this recess is provided with a vent tube 45 leading to the atmosphere such Freon as might accumulate is vented to the atmosphere, likewise any leak of $CO_2$ around the joint would eventually find its way into the recess 41 and thus be vented to the atmosphere. By confining the leakage of either Freon or $CO_2$ to a small diameter tube such as the tube 45, such a leak may be more easily detected due to the fact that the leakage is coming out of a small opening and would tend to create a slight sound. Furthermore from time to time a test can be made at the end of this tube by the way of a halide light for Freon leak or by connecting the vent tube with a container having a solution of calcium chloride therein for a $CO_2$ leak.

Figures 3, 4:
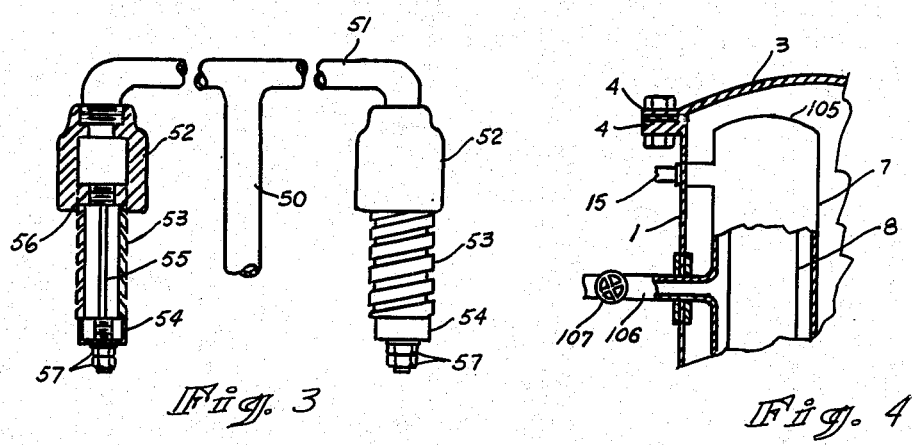
Fig. 3 is a detailed view, partially in section, of the spray heads used in connection with our invention.
Fig. 4 is a detailed view of a modification of the refrigerating and carbonating tank and Fig. 5 is a diagrammatic view of the circuit arrangement for controlling the operation of the supply and recirculating pumps.

After the water has been refrigerated and partially carbonated it is withdrawn from the bottom of the tank 7 by the way of an outlet pipe 46 which has a branch 47 extending to a pump 48 driven by a motor 49 and from this pump 48 a delivery pipe 50 extends to a spray head disposed in the top of the tank 1. This spray head, as shown in Fig. 3, preferably consists of a multiplicity of spray nozzles, in the present instance two, connected to the opposite ends of branch 51 of the delivery pipe 50.

Each of the spray nozzles comprises a hollow coupling 52 screw-threaded onto the end of the branch 51 and supporting a flat ribbon-like helical coil 53 in the nature of a spring. The lower end of this coil rests on a cup support 54 and the upper end bears within a socket on the coupling 52. The cup 54 is supported upon the lower end of a rod 55 threaded onto a spider 56 in the coupling, with suitable adjusting nuts 57 on the lower end of the rod for supporting the cup 54. By the adjustment of the nuts 54 the spacing between the convolutions of the spring 53 may be controlled to obtain the determined degree of fineness of the spray.

$CO_2$ under a predetermined pressure is admitted to the tank 1 through a connection 58 which leads to a source of $CO_2$ supply. The pressure at which the $CO_2$ is delivered to the tank 1 is controlled by a regulating valve 59.

The pipes 46, 47 and 50 provide a recirculating system for the refrigerated and partially carbonated water of the tank 7. However, the pipe 46 may be extended to a withdrawal pipe 60 provided with a control valve 61 so that by suitable manipulation of the valve 61 and valve 62 the water of the tank 7 may be withdrawn and delivered directly to the point of consumption. The water in the tank 1 may be withdrawn and delivered to the point of consumption through the pipe 63 having provided therein a valve 64.

During the filming and spraying of the water within the tanks 1 and 7 the water gives up a certain amount of air which being lighter than $CO_2$ will accumulate in the top of the tank 1. It is desirable and of course almost necessary to discharge this air during the operation of the apparatus in order to prevent a large accumulation of air in the top of the tank. The accumulated air in the carbonator body builds up a partial pressure in the carbonator body. As a result a false reading is given to the pressure gauge indicating $CO_2$ pressure. The pressure gauge may show 100# pressure but instead of this being 100# $CO_2$ pressure there may be only 70# $CO_2$ pressure and the rest air pressure. This of course reduces the degree of carbonation of the water. To this end we provide a discharge pipe 65 communicating with the top of the tank and leading to a snift control valve 14. This control valve 14 is provided with a chamber divided into upper and lower chambers 66 and 67 by a diaphragm 68. The upper chamber 66 communicates through passageway 69 with the pipe 65 and also through a valved port 70 to an escape opening 71 controlled by an adjustable needle valve 72. This valved port 70 is controlled by a valve 73 on a stem 74 which is biased in a position to close the valve 73 by a coiled spring 75. The lower end of the stem 74 is connected to the diaphragm 68. The pipe 12 delivers by the way of the pump 13 to the bottom chamber 67 of the snift valve 14 and from this chamber delivery is made to the inlet pipe 15. Therefore, as the water flows into the chamber 67 the pressure of the water raises a control valve 76 against the bias of the spring 77 and flowing into the chamber acts against the diaphragm 68 to open the valve 73. Therefore, as long as the inlet water is flowing through the inlet pipe 15 the top of the tank 1 is vented to the atmosphere. As soon as water ceases to flow, however, the valve 76 will close relieving the pressure on the diaphragm 68 thus permitting the valve 73 to close. Thus during the non-flow of inlet water to the tank 1 the tank is sealed against the atmosphere.

The starting and stopping of the pump motors 16 and 49 is controlled by the water level in the tanks 1 and 7. To this end a water level gauge casing 80 has bottom and top connections 78 and 79 with the tank 7. Interposed between these connections 78 and 79 is a gauge glass 80' through which the level in the tank may always be observed. Arranged within the gauge casing 77 is a low level electrode 81 and a high level electrode 82.

A similar gauge casing 84 is provided for the tank 1, having inlet and outlet connections 85 and 86 with the tank and likewise interposed between these connections is a gauge glass 87. Arranged within this gauge casing 84 is a low level electrode 89 and a high level electrode 90.

In operating the apparatus for refrigerating and carbonating, the preferably filtered water is delivered from a suitable source through pipe 12 and pump 13 and through the shift valve 14 and pipe 15 to the distributor cup 10. At the same time the refrigerating medium is delivered to the tube or evaporator 8. Also $CO_2$ from a suitable source of supply is delivered through the pressure controlled valve 59 to the tank 1. Therefore, an atmosphere of $CO_2$ under a predetermined pressure is provided in the tank 1 and likewise due to the fact that the tank 7 is open at its top to tank 1 and through a suitable communicating opening 91 a similar atmosphere of $CO_2$ is provided in tank 7. As the water films down the sides of the evaporator tube 8 the heat is absorbed therefrom and the water is properly chilled. At the same time a certain proportion of $CO_2$ is absorbed by the water. The water is then withdrawn from the bottom of the tank 7 and through the pipes 46 and 47, the valve 62 and the pump 48, delivered to the spray nozzles at the top of the tank 1. It is broken up into fine particles by these spray nozzles and as these particles pass down through the atmosphere of $CO_2$ in tank 1, the water becomes thoroughly carbonated. The water may then be drawn from the bottom of tank 1 through the discharge pipe 63 and valve 64 to the point of distribution. It is to be noted that the tank 1 is of comparatively large capacity so that an ample reserve of carbonated water may be maintained in this tank to permit a thorough carbonation of the water before it is delivered to the distributing machine.

In some instances, with certain types of carbonated beverages, carbonated water of a relatively low $CO_2$ content is desired. Under these circumstances the valve 62 may be closed together with the valve 64 and with the valve 61 opened the supply may be taken directly from tank 7. Conversely if it is desired to use the water with a high degree of carbonation the valve 61 may be closed and the valve 62 opened so that the water will be circulated through the tank 1 before withdrawing the same from the tank by opening the valve 64.

In Fig. 4 there is illustrated a modification of the structure illustrated in Fig. 1 which provides for separate carbonation of the water in the refrigerating tank 7. It is sometimes desirable to subject the water during the refrigerating period to a different pressure than it would be in the tank 1. More often than not the pressure would be lower. In order to accomplish this result the tank 7 is closed at its top, as at 105 and is provided with a separate $CO_2$ intake 106 controlled by a pressure regulating valve 107. Therefore, in this structure the $CO_2$ in the tank 7, being admitted from a separate source and the tank 7 being closed against tank 1, the pressure in the tank 7 may be modified independently of the tank 1.

Figure 5:
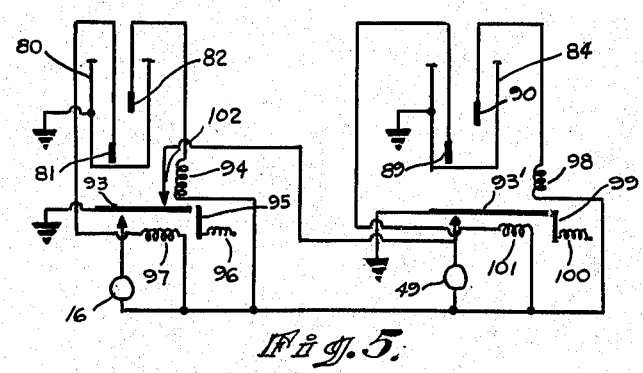

In Fig. 5 we have illustrated, diagrammatically, a circuit arrangement whereby through the electrodes 81 and 82, and 89 and 90, the starting and stopping of the motors 16 and 49 may be controlled in accordance with the water level in the tanks. In this arrangement the motor 16 is controlled by a relay switch 93 and the motor 49 is controlled by a relay switch 93' both switches being so arranged that when they are in the "down" position, circuit through the pumps is completed. The opening of the relay switch 93 is effected by an electromagnet winding 94 connected to the line and to electrode 82. A holding dog 95 is associated with the switch 93, biased in released position by a coiled spring 96 and moved to a latching position by an electromagnet 97 in turn connected to the electrode 81.

Likewise switch 93' is moved to open position by an electromagnet 98 connected to the electrode 90 and a latch 99, biased in its unlatching position by a spring 100 is adapted to maintain the switch 93' in its open position. This latch 99 is moved to its latching position by electromagnet 101 connected to electrode 89. An on-contact 102 cooperating with the switch 93, is connected to one terminal of the motor 49. The on-position of both switches 93 and 93' is in the "down" position and in the on-position circuit is closed through both of the motors 16 and 49. With the motor 16 running, the tank 7 is being supplied with water and when the water level reaches electrode 81 the electromagnet 97 is energized biasing the latch 95 toward latching position. As the water level in tank 7 rises, the water eventually contacts the electrode 82 thereby completing the circuit of the electromagnet 94 moving the switch 93 to open position. When the switch 93 is moved to open position the electromagnet 97 moves the latch 95 in latching position to hold the switch 93 in open position as long as the water level stays above the bottom of electrode 81. When, however, the water level drops below the electrode 81 the electromagnet 97 will be de-energized thereby permitting latch 95 to move out of holding position and permitting the switch 93 to close and start the motor 16 again. It is thus observed that when the water reaches a maximum level the motor 16 is stopped and when the water reaches a minimum level the motor 16 is started.

Likewise with the switch 93' in its "down" or closed position, the motor 49 will be operating.

When the water level in tank 1 reaches electrode 89 electromagnet 101 will be energized biasing the latch 99 toward holding position. When the water level reaches the electrode 90 the electromagnet 98 will be energized moving the switch 93' to open position and the latch 99 will be moved to latching position. When the water level drops below electrode 89 the electromagnet 101 will be de-energized and under the influence of the coiled spring 100 the latch 99 will be moved to unlatching position permitting switch 93' to close thereby starting the motor 49.

It is desirable that motor 49 be started when the water level in tank 7 reaches the maximum. Therefore, when the water level in the tank 7 reaches the maximum to energize the electromagnet 94 moving switch 93 to open position, the switch 93 will engage the contact 102 thereby closing the circuit to the motor 49 and starting the recirculating pump to operating.

We claim as our invention:

1. An apparatus of the character described, in combination; a closed tank; means for delivering to said tank $CO_2$ under a predetermined pressure; a closed bottom relatively small refrigerating tank disposed in said first tank having an open top communicating with the interior of the first tank and receiving an atmosphere of $CO_2$ from said first tank; a double walled refrigerating tube disposed longitudinally in said refrigerating tank; water filming means delivering water to the top of said tube at a point where the water will flow down the inside and outside walls of said tube in a film formation; means for circulating a refrigerant between the double walls of said tube; means for supplying water to said water filming means; a spray head mounted at the top of said first tank and means for withdrawing the water from the bottom of said refrigerating tank and delivering the same to the spray head at the top of said first tank.

2. In an apparatus of the character described, in combination; a closed tank; means for delivering to said tank $CO_2$ under predetermined pressure; a relatively small refrigerating tank disposed in said first tank and adapted to have an atmosphere of $CO_2$ delivered thereto; a double walled refrigerating tube disposed longitudinally within said refrigerating tank; water filming means delivering water to the top of said tube at a point where the water will flow down the inside and outside walls of said tube; means for circulating a refrigerant between the double walls of said tube; means for supplying water to said water filming means; a spray head mounted at the top of the first tank and means for withdrawing the water from the bottom of said refrigerating tank and delivering the same to the spray head.

3. In an apparatus of the character described, in combination; a closed tank; means for delivering to said tank $CO_2$ under predetermined pressure; a closed bottom relatively small refrigerating tank disposed in said first tank having an open top communicating with the interior of said first tank and receiving an atmosphere of $CO_2$ from said first tank; a double walled refrigerating tube disposed longitudinally within said refrigerating tank; water filming means delivering water to the top of said tube at a point where the water will flow down the inside and outside walls of said tube; means for circulating a refrigerant between the double walls of said tube; means for supplying water to said water filming means; a spray head mounted at the top of said first tank and means for withdrawing the water from the bottom of said refrigerating tank and delivering the same to the spray head; a snift valve connected to the top of said first tank biased toward closed position, and means for maintaining said snift valve open by the flow of water to said refrigerating tank.

4. In an apparatus of the character described, in combination; a closed tank; means for delivering to said tank $CO_2$ under predetermined pressure; a closed bottom relatively small refrigerating tank disposed in said first tank having an open top communicating with the interior of said first tank and receiving an atmosphere of $CO_2$ from said first tank; a double walled refrigerating tube disposed longitudinally within said refrigerating tank; water filming means delivering water to the top of said tube at a point where the water will flow down the inside and outside walls of said tube; means for circulating a refrigerant between the double walls of said tube; means for delivering water to said filming means, including a pump; a spray head mounted in the top of said first tank; means for removing water from said refrigerating tank and delivering water to said spray head, including a second pump; control means for controlling the starting and stopping of the first pump in accordance with the water level in said refrigerating tank.

5. In an apparatus of the character described, in combination; a closed tank; means for delivering to said tank $CO_2$ under predetermined pressure; a closed bottom relatively small refrigerating tank disposed within said first tank having an open top communicating with the interior of said first tank and receiving an atmosphere of $CO_2$ from said first tank; a double walled refrigerating tube disposed longitudinally within said refrigerating tank; water filming means delivering water to the top of said tube at a point where the water will film down the inside and outside walls of said tube; means for circulating a refrigerant between the double walls of said tube; means for supplying water to said refrigerating tank, including a pump, and means for controlling the starting and stopping of said pump in accordance with the water level in said refrigerating tank; a spray head in the top of said first tank and means for withdrawing water from the bottom of said refrigerating tank and delivering the same to said spray head, including a pump, and means for starting and stopping said second pump in accordance with the water level in said first tank.

JAMES KANTOR.
EDWARD ROSENBERG.

REFERENCES CITED

The following references are of record in the file of this patent:

UNITED STATES PATENTS

| Number | Name | Date |
| --- | --- | --- |
| 1,611,321 | Schmidt | Dec. 21, 1926 |
| 1,703,723 | Cromwell | Feb. 26, 1929 |
| 1,842,872 | Henser | Jan. 26, 1932 |
| 1,972,994 | Huntley | Sept. 11, 1934 |
| 2,195,449 | Delen | Apr. 2, 1940 |
| 2,212,275 | Mojonnier | Aug. 20, 1940 |
| 2,337,783 | Thompson et al. | Dec. 28, 1943 |
| 2,338,686 | Gredell | Jan. 4, 1944 |
| 2,388,850 | Kantor | Nov. 13, 1945 |
| 2,434,374 | Tull | Jan. 13, 1948 |
| 2,435,774 | Di Pietro | Feb. 10, 1948 |